US012359507B2

(12) United States Patent
Parker et al.

(10) Patent No.: US 12,359,507 B2
(45) Date of Patent: Jul. 15, 2025

(54) STRAND GRAB, LADDER AND METHOD

(71) Applicant: Werner Co., Greenville, PA (US)

(72) Inventors: Thomas W. Parker, Jamestown, PA (US); Adrien Covington, Aurora, IL (US); Claire Armenoff, Montgomery, IL (US)

(73) Assignee: Werner Co., Greenville, PA (US)

( * ) Notice: Subject to any disclaimer, the term of this patent is extended or adjusted under 35 U.S.C. 154(b) by 1048 days.

(21) Appl. No.: 17/367,219

(22) Filed: Jul. 2, 2021

(65) Prior Publication Data

US 2022/0010619 A1 Jan. 13, 2022

Related U.S. Application Data

(60) Provisional application No. 63/049,898, filed on Jul. 9, 2020.

(51) Int. Cl.

| | |
|---|---|
| ***E06C 1/36*** | (2006.01) |
| ***B66C 1/36*** | (2006.01) |
| ***E06C 1/04*** | (2006.01) |
| ***E06C 1/34*** | (2006.01) |
| ***E06C 7/18*** | (2006.01) |
| ***E06C 7/48*** | (2006.01) |

(52) U.S. Cl.
CPC .................. *E06C 1/36* (2013.01); *E06C 7/48* (2013.01); *B66C 1/36* (2013.01); *E06C 1/04* (2013.01); *E06C 1/34* (2013.01); *E06C 7/188* (2013.01)

(58) Field of Classification Search
CPC ..... E06C 1/36; E06C 7/48; E06C 1/04; E06C 7/505; E06C 7/186; E06C 7/188; E06C 1/34; B66C 1/36
See application file for complete search history.

(56) References Cited

U.S. PATENT DOCUMENTS

| | | | | |
|---|---|---|---|---|
| 2005/0284703 A1* | 12/2005 | Deuer | E06C 7/186 | 182/206 |
| 2014/0367194 A1* | 12/2014 | Bolinski | E06C 7/188 | 182/107 |
| 2015/0075905 A1* | 3/2015 | Ballard | E06C 1/36 | 182/107 |
| 2019/0063152 A1* | 2/2019 | Valdez Ontiveros | E06C 7/48 | |
| 2019/0360271 A1 | 11/2019 | Valdez Ontiveros | | |

FOREIGN PATENT DOCUMENTS

| | | | |
|---|---|---|---|
| EP | 3013725 B1 * | 3/2019 | B66C 1/36 |

* cited by examiner

*Primary Examiner* — Omar F Hijaz
(74) *Attorney, Agent, or Firm* — Fitch, Even, Tabin & Flannery LLP

(57) ABSTRACT

A strand grab for a ladder having a hook assembly, a gate assembly engaged with the hook assembly and a biasing spring. The biasing spring produces a return biasing force which is less than a weight force of the ladder when the hook assembly rests on the strand allowing the gate assembly to close with the hook assembly and squeeze the strand between the gate assembly and the hook assembly in a closed position and hold the ladder in place with the strand. A ladder for use with a strand having a first rail and a second rail. The first rail has a first strand grab directly attached to the first rail and the second rail has a second stand grab directly attached to the second rail. A method for using a ladder. A method for making a ladder.

14 Claims, 7 Drawing Sheets

STRAND GRAB, LADDER AND METHOD

CROSS-REFERENCE TO RELATED APPLICATIONS

This is a nonprovisional of U.S. provisional patent application Ser. No. 63/049,898 filed Jul. 9, 2020, incorporated by reference herein.

FIELD OF THE INVENTION

This invention relates to utilizing a hooking system at the top of a ladder to grab/grip and retain a utility strand when the ladder is set up. (As used herein, references to the "present invention" or "invention" relate to exemplary embodiments and not necessarily to every embodiment encompassed by the appended claims.) More specifically, the present invention relates to utilizing a hooking system at the top of an extension ladder to grab/grip and retain a utility strand when the ladder is set up by using the weight of the ladder itself to cause the hooking system to grab/grip and retain a utility strand.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Strands, including wires and cables, held by poles or attached to buildings, are a common site throughout the world. This means that strands, or the equipment supporting the strands, at various times need to be serviced. Ladders are often used to access the strands or the equipment supporting the strands by leaning the ladders against the strands. When a ladder is leaned against a strand, there is always a concern that the ladder could somehow slide relative to the strand and come off the strand, risking injury to a user who has climbed up the ladder, or damage to the ladder or articles on the ladder, or damage to the strand or equipment supporting the strand. What is needed is a straightforward way for a user to easily lean a ladder against a strand and secure the ladder to the strand so the concern that the ladder could somehow slide relative to the strand is effectively eliminated.

BRIEF SUMMARY OF THE INVENTION

The present invention pertains to a strand grab for a ladder. The strand grab comprises a hook assembly which engages with the ladder. The strand grab comprises a gate assembly engaged with the hook assembly. The strand grab comprises a biasing spring engaged with the hook assembly and the gate assembly which produces a return biasing force which is less than a weight force of the ladder when the hook assembly rests on the strand allowing the gate assembly to close with the hook assembly and squeeze the strand between the gate assembly and the hook assembly in a closed position and hold the ladder in place with the strand.

The present invention pertains to a ladder for use with a strand. The ladder comprises a first rail. The ladder comprises a second rail in parallel and space relation with the first rail. The ladder comprises rungs attached to and between the first and second rails. The first rail has a first strand grab directly attached to the first rail and the second rail has a second stand grab directly attached to the second rail. The first and second strand grabs each comprise a hook assembly; a gate assembly engaged with the hook assembly; and a biasing spring engaged with the hook assembly and the gate assembly which produces a return biasing force which is less than a weight force of the ladder when the hook assembly rests on the strand allowing the gate assembly to close with the hook assembly and squeeze the strand between the gate assembly and the hook assembly in a closed position and hold the ladder in place with the strand.

The present invention pertains to a method for using a ladder. The method comprises the steps of placing a hook assembly of a first strand grab attached to a first rail of the ladder and a hook assembly of a second strand grab attached to a second rail of the ladder on a strand. There is the step of resting the hook assembly of the first strand grab and the hook assembly of the second strand grab on the strand so a weight force of the ladder causes a gate assembly of the first strand grab to overcome a biasing force of a biasing spring of the first strand grab engaged with the gate assembly of the first strand grab and close with the hook assembly of the first strand grab to squeeze the strand between the gate assembly and the hook assembly of the first strand grab to a closed position, and a gate assembly of the second strand grab to overcome a biasing force of a biasing spring of the second strand grab engaged with the gate assembly of the second strand grab and close with the hook assembly of the second strand grab to squeeze the strand between the gate assembly and the hook assembly of the second strand grab to a closed position and hold the ladder in place with the strand.

The present invention pertains to a method for making a ladder. The method comprises the steps of attaching a first strand grab to a first rail of the ladder. There is the step of attaching a second strand grab to a second rail of the ladder. The first and second strand grabs each comprise a hook assembly; a gate assembly engaged with the hook assembly; and a biasing spring engaged with the hook assembly and the gate assembly which produces a return biasing force which is less than a weight force of the ladder when the hook assembly rests on the strand allowing the gate assembly to close with the hook assembly and squeeze the strand between the gate assembly and the hook assembly in a closed position and hold the ladder in place with the strand.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
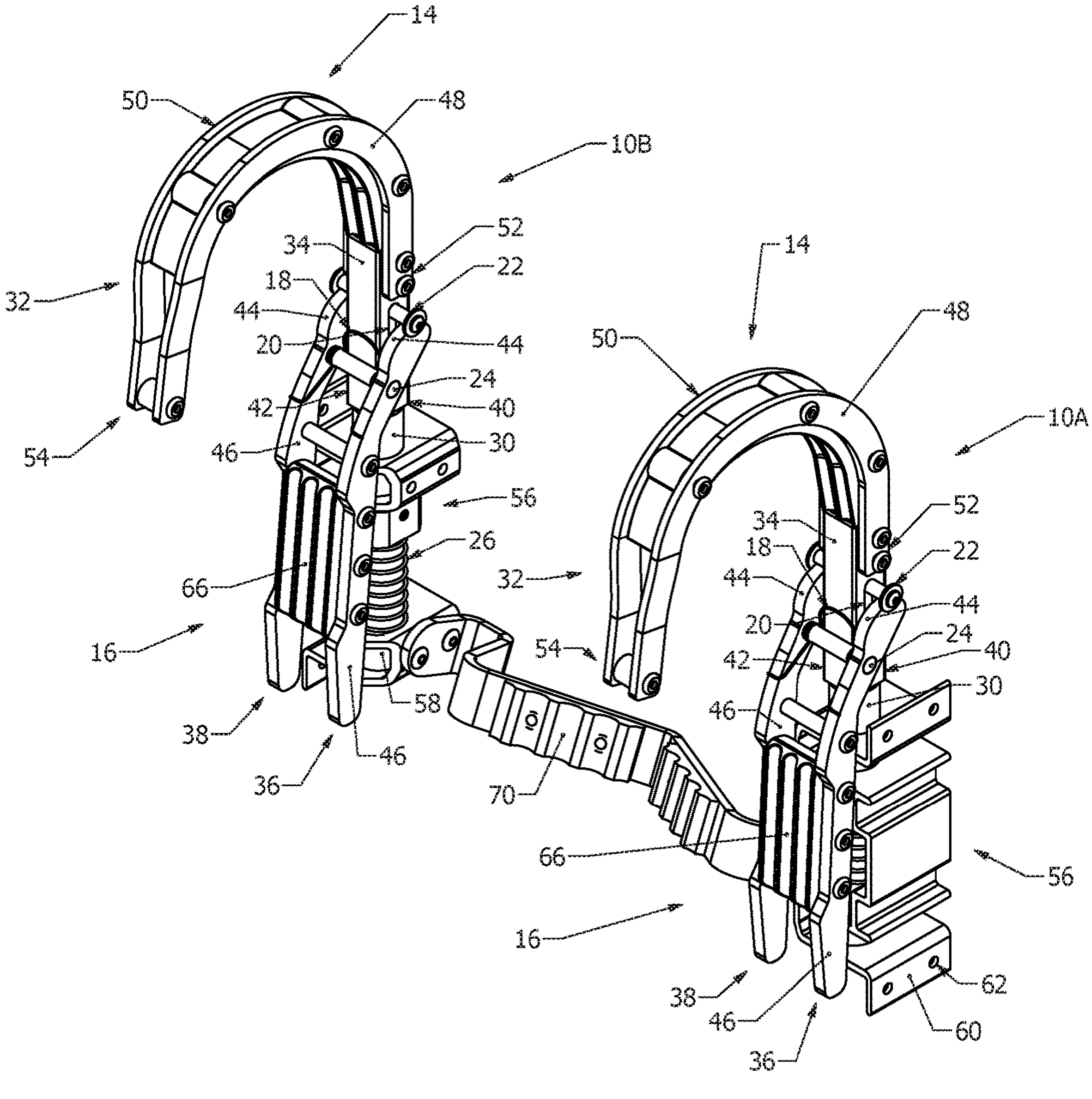
FIG. 1 shows the strand grab in its completed assembly form.
Figure 2:
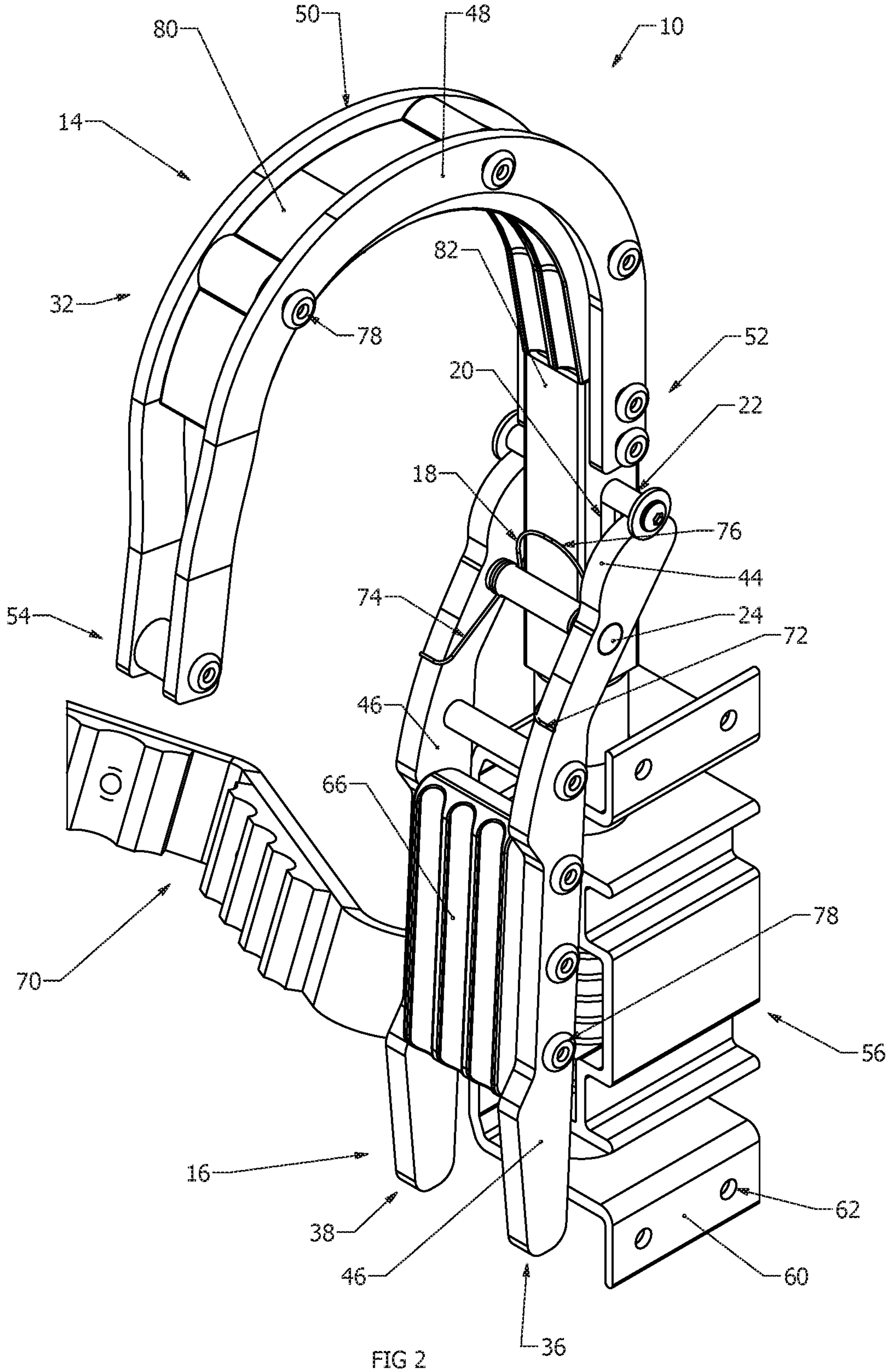
FIGS. 2 and 3 show the strand grab gate mechanism in an open and closed position, respectively.
Figure 3:
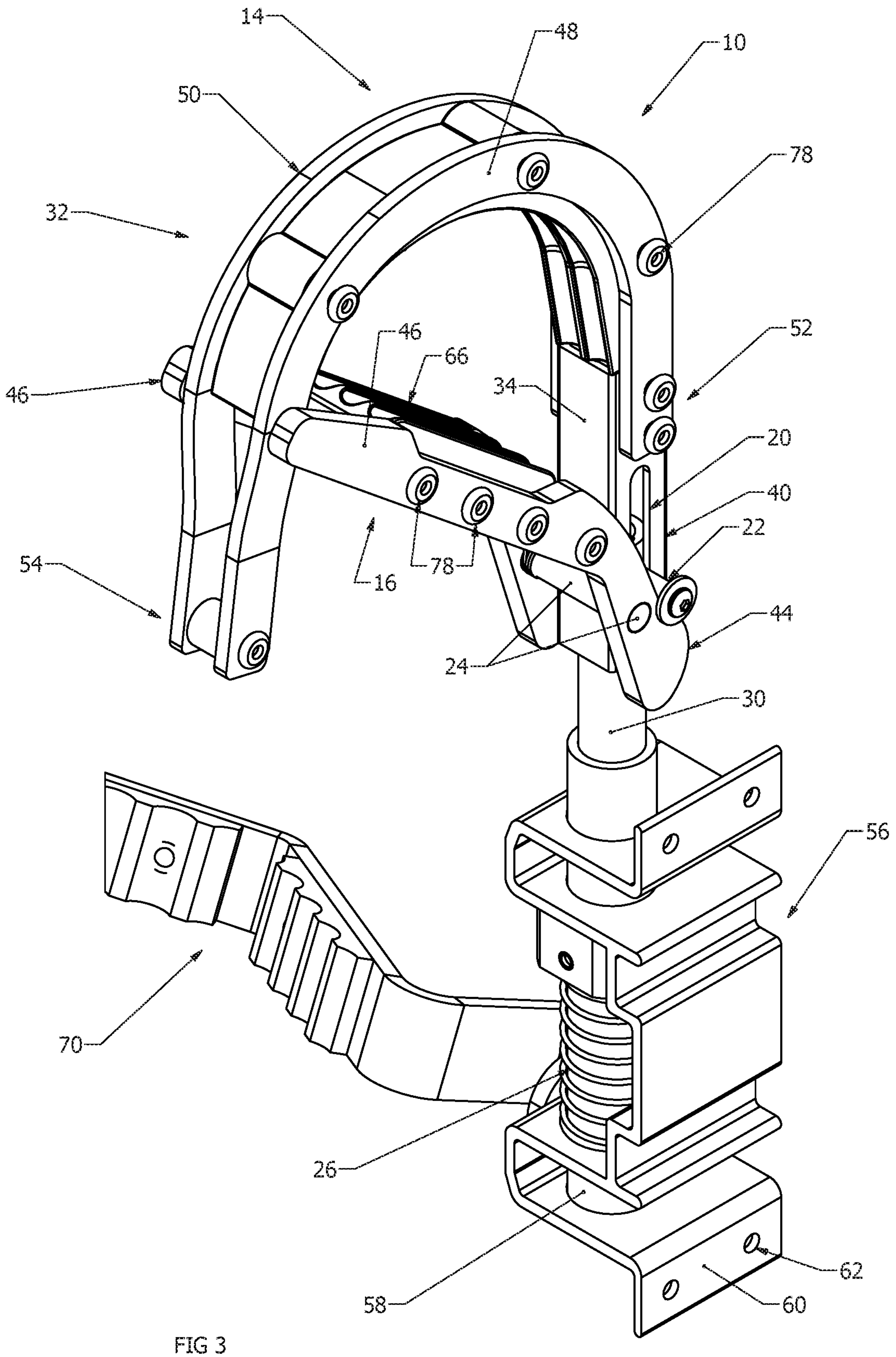
Figure 7:
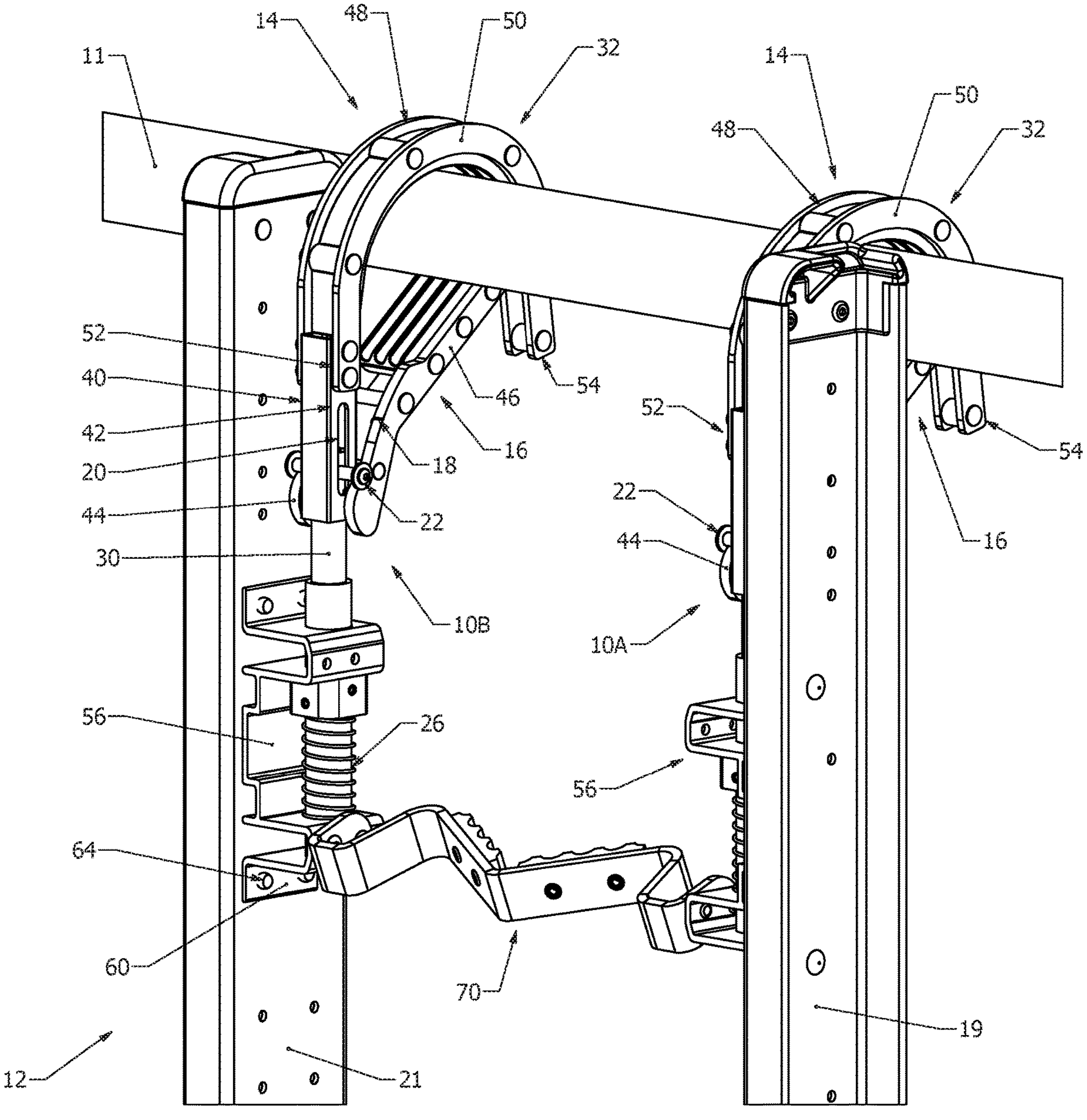
FIG. 7 shows the hook assemblies and the gate assemblies fully engaged with the strand.

Referring now to the drawings wherein like reference numerals refer to similar or identical parts throughout the several views, and more specifically to FIGS. 1-3 thereof, there is shown a strand grab 10 for a ladder 12 having a first rail 19 and a second rail 21. The strand grab 10 comprises a hook assembly 14 which engages with the ladder 12. The strand grab 10 comprises a gate assembly 16 engaged with the hook assembly 14. The strand grab 10 comprises a biasing spring 18 engaged with the hook assembly 14 and the gate assembly 16 which produces a return biasing force which is less than a weight force of the ladder 12 when the hook assembly 14 rests on the strand 11 allowing the gate assembly 16 to close with the hook assembly 14 and squeeze the strand 11 between the gate assembly 16 and the hook assembly 14 in a closed position and hold the ladder 12 in place with the strand 11, as shown in FIG. 3 and FIG. 7.

Figure 6:
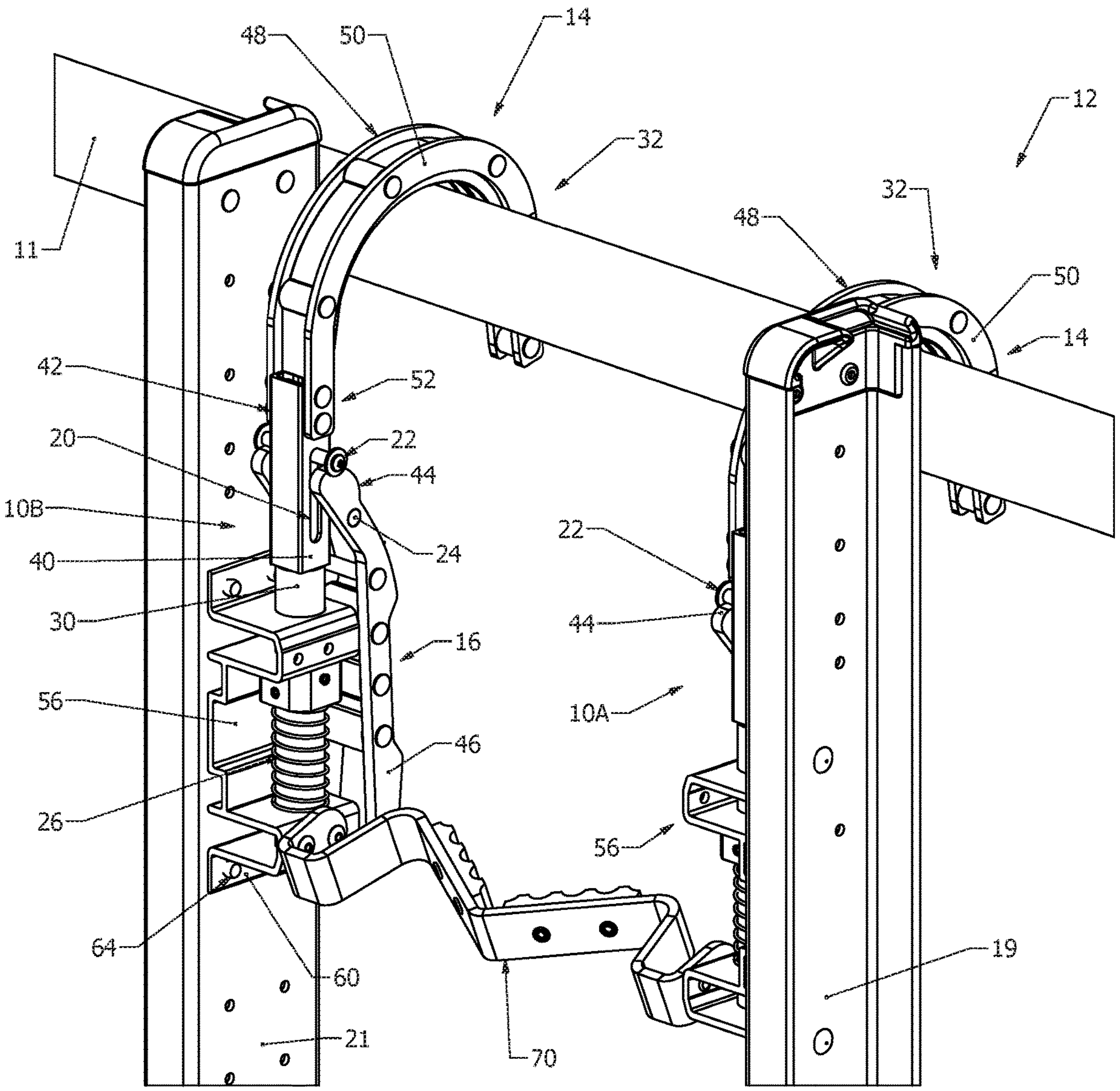
FIG. 6 shows the first and second hook portions of the first and second strand grabs being placed over a strand.

The hook assembly 14 may have a slot 20, and there may be a cam pin 22 disposed in the slot 20. The cam pin 22 moves down the slot 20 and directly pushes against the gate assembly 16 causing the gate assembly 16 to close with the hook assembly 14 into the closed position. The cam pin 22 moves up the slot 20 allowing the biasing spring 18 to move the gate assembly 16 away from the hook assembly 14 into an open position and disengage the gate assembly 16 from the strand 11 when the hook assembly 14 is lifted from the strand 11, as shown in FIGS. 2 and 6. The hook assembly 14 may include a pivot pin 24 about which the gate assembly 16 rotates when the cam pin 22 moves down, as shown in FIGS. 2 and 3. The slot 20 may be disposed in a housing of the hook assembly 14.

Figure 4:
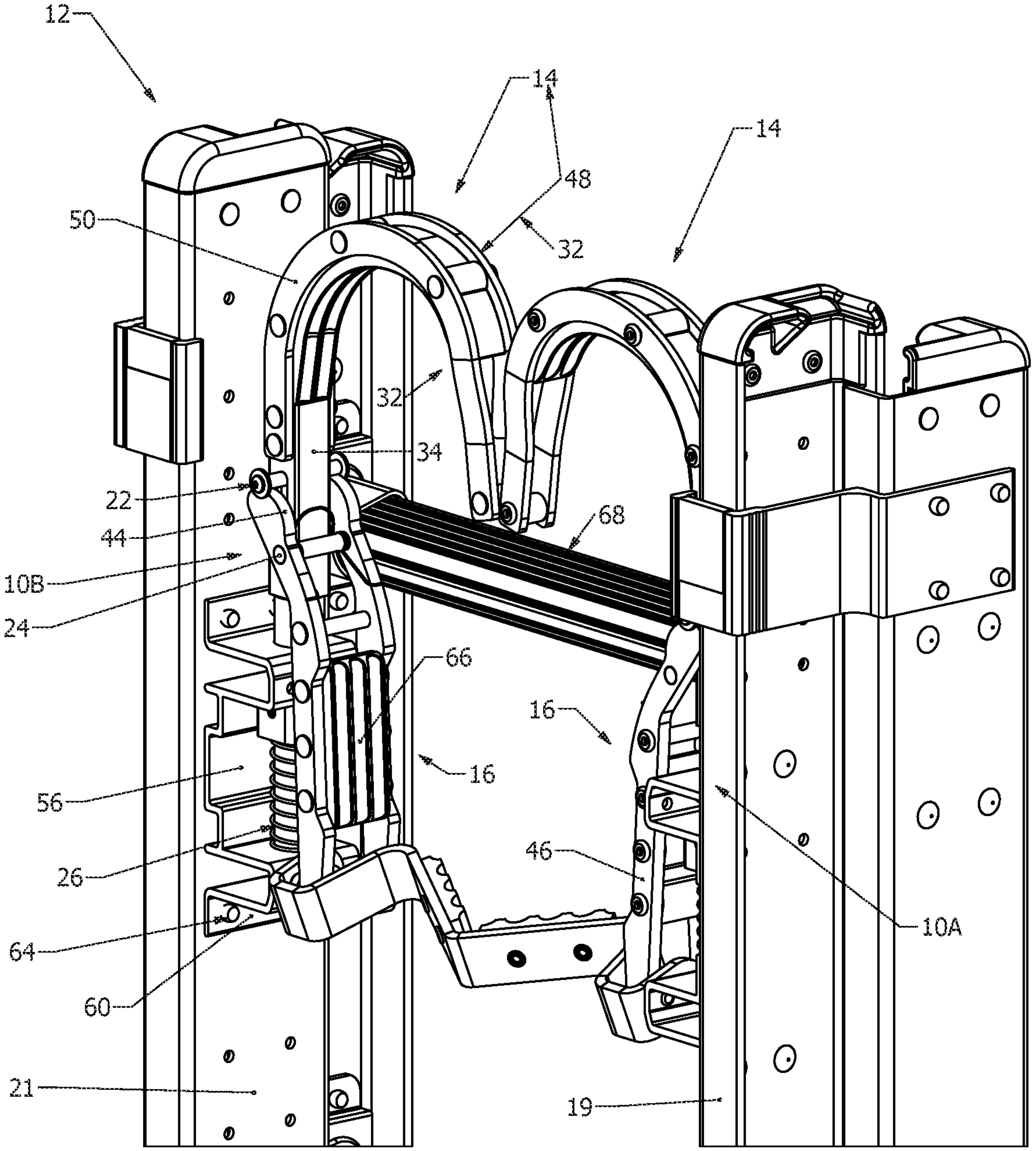
FIG. 4 shows the strand grab mounted to an extension ladder. The orientation that it is in is considered the "STOW" or storage position.
Figure 5:
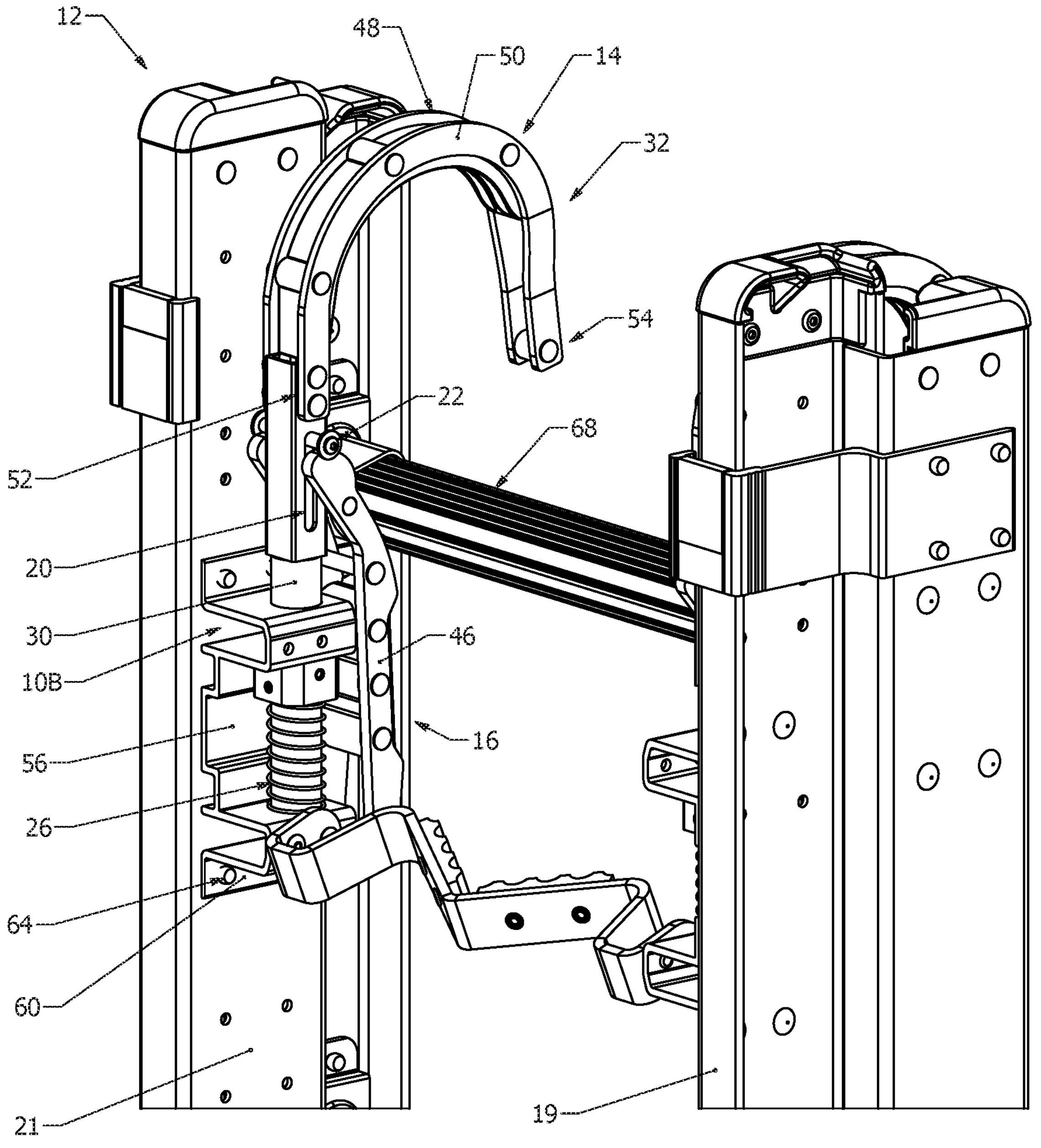
FIG. 5 shows the strand grab mounted to an extension ladder. The orientation that it is in is considered the "DEPLOY" or ready to use position.

The biasing spring 18 may engage with the pivot pin 24. The strand grab 10 may include a compression spring 26 disposed about the hook assembly 14. When the compression spring 26 is compressed, the hook assembly 14 is able to rotate between a stowed position, as shown in FIG. 4, where the hook assembly 14 extends in a plane 28 defined by the first and second rails 19, 21, and a deployed position, as shown in FIG. 5, with the hook assembly 14 extends perpendicular to the plane 28. The hook assembly 14 may include a shaft 30 about which the compression spring 26 is disposed, and a hook portion 32 attached to and extending up from the shaft 30. The slot 20 may be disposed along a length of the shaft 30 adjacent where the hook assembly 14 attaches to the shaft 30, and the pivot pin 24 may be attached to the shaft 30 along a width of the shaft 30 adjacent the slot 20 on an interior side 34 of the shaft 30. The housing may be positioned about the shaft 30 with the pivot pin 24 attached to a plate on the interior side 34 of the hook assembly 14.

The gate assembly 16 may include a first gate portion 36 and a second gate portion 38 in parallel and spaced relation with the first gate portion 36, as shown in FIGS. 2 and 3. The first gate portion 36 disposed on a first side 40 of the shaft 30 and the second gate portion 38 disposed on a second side 42 of the shaft 30. The pivot pin 24 may be rotatably attached to and between the first gate portion 36 and the second gate portion 38. The first gate portion 36 and the second gate portion 38 each have a cam profile 44 disposed below the cam pin 22 and alongside the slot 20 and an elongate portion 46 extending from the cam profile 44 with the pivot pin 24 disposed between the cam profile 44 and the elongate portion 46. The first gate portion 36 and the second gate portion 38 may be attached together with the rivets 78.

The hook assembly 14 may include a first hook portion 48 and a second hook portion 50 in parallel and spaced relation with the first hook portion 48. The first hook portion 48 disposed on the first side 40 of the shaft 30 and the second hook portion 50 disposed on the second side 42 of the shaft 30, and preferably to the housing. The first hook portion 48 and the second hook portion 50 each having an arc shape with a base 52 attached to the shaft 30 above the slot 20, and preferably the housing, and a tip 54. The first hook portion 48 and the second hook portion 50 configured to fit on and about the strand 11 between the base 52 and the tip 54. The first hook portion 48 and the second hook portion 50 may be attached together with rivets 78. There may be a cover 80 that attaches between the first hook portion 48 and the second hook portion 50.

The hook assembly 14 may include an attachment assembly 56 in which a lower end 58 of the shaft 30 with the compression spring 26 is disposed. The attachment assembly 56 may have a flange 60 with a hole 62 through which a fastener 64 extends into the first rail 19 to fixedly attach the attachment assembly 56 and thus the strand grab 10 to the first rail 19. There may be a second flange with a hole 62 through which a fastener 64 extends into the first rail 19 to fixedly attach the attachment assembly 56 to the first rail 19. There may be a flat contact portion of the attachment assembly 56 disposed between the flange 60 is that contacts the first rail 19 and provides further support and balance to the attachment assembly 56 as it is attached to the first rail 19.

The strand grab 10 may include a pad 66 disposed on the hook assembly 14 which directly contacts the strand 11 when the hook assembly 14 and the gate assembly 16 are in the closed position, and the first hook portion 48 and the second hook portion 50 are disposed between the first gate portion 36 and the second gate portion 38 when the hook assembly 14 and the gate assembly 16 are in the closed position. The pad 66 may be disposed in indentations of the first and second gate portions 36, 38 in which the pad 66 fits so the surface of the pad 66 does not extend above the top of the first and second gate portions 36, 38.

The present invention pertains to a ladder 12 for use with a strand 11, as shown in FIGS. 4-7. The ladder 12 comprises a first rail 19. The ladder 12 comprises a second rail 21 in parallel and space relation with the first rail 19. The ladder 12 comprises rungs 68 attached to and between the first and second rails 19, 21. The first rail 19 has a first strand grab 10A directly attached to the first rail 19 and the second rail 21 has a second stand grab directly attached to the second rail 21. The first and second strand grabs 10A, 10B each comprise a hook assembly 14; a gate assembly 16 engaged with the hook assembly 14; and a biasing spring 18 engaged with the hook assembly 14 and the gate assembly 16 which produces a return biasing force which is less than a weight force of the ladder 12 when the hook assembly 14 rests on the strand 11 allowing the gate assembly 16 to close with the hook assembly 14 and squeeze the strand 11 between the gate assembly 16 and the hook assembly 14 in a closed position and hold the ladder 12 in place with the strand 11, as shown in FIG. 7.

The ladder 12 may include a bracket 70 attached to and between the hook assembly 14 of the first stand grab and the second stand grab. The bracket 70 having a V shape which fits to a pole or exterior corner of a structure. The bracket 70 may have a pad 66 disposed on the surface side which rests against the pole or exterior corner of the structure. The pad 66 may have treads to increase the grip of the pad 66.

The present invention pertains to a method for using a ladder 12. The method comprises the steps of placing a hook assembly 14 of a first strand grab 10A attached to a first rail 19 of the ladder 12 and a hook assembly 14 of a second strand grab 10B attached to a second rail 21 of the ladder 12 on a strand 11. There is the step of resting the hook assembly 14 of the first strand grab 10A and the hook assembly 14 of the second strand grab 10B on the strand 11 so a weight force of the ladder 12 causes a gate assembly 16 of the first strand grab 10A to overcome a biasing force of a biasing spring 18 of the first strand grab 10A engaged with the gate assembly 16 of the first strand grab 10A and close with the hook assembly 14 of the first strand grab 10A to squeeze the strand 11 between the gate assembly 16 and the hook assembly 14 of the first strand grab 10A to a closed position, and a gate assembly 16 of the second strand grab 10B to overcome a biasing force of a biasing spring 18 of the second strand grab 10B engaged with the gate assembly 16 of the second strand grab 10B and close with the hook assembly 14 of the second strand grab 10B to squeeze the strand 11 between the gate assembly 16 and the hook assembly 14 of the second strand grab 10B to a closed position and hold the ladder 12 in place with the strand 11.

The present invention pertains to a method for making a ladder 12. The method comprises the steps of attaching a first strand grab 10A to a first rail 19 of the ladder 12. There is the step of attaching a second strand grab 10B to a second rail 21 of the ladder 12. The first and second strand grabs 10A, 10B each comprise a hook assembly 14; a gate assembly 16 engaged with the hook assembly 14; and a biasing spring 18 engaged with the hook assembly 14 and the gate assembly 16 which produces a return biasing force which is less than a weight force of the ladder 12 when the hook assembly 14 rests on the strand 11 allowing the gate assembly 16 to close with the hook assembly 14 and squeeze the strand 11 between the gate assembly 16 and the hook assembly 14 in a closed position and hold the ladder 12 in place with the strand 11.

In the operation of the invention, a hooking system embodied in a first strand grab 10A and a second strand grab 10B disposed adjacent the top of a first rail 19 and a second rail 21, respectively, of a fly section of an extension ladder 12, is used to grab/grip and retain a horizontal utility strand 11 when the ladder 12 is set up. This technique of setting up an extension ladder 12 is particularly useful for the telecommunication industry.

This invention does not require any additional ropes and/or locking mechanisms to fully utilize the present invention. This invention has been designed to provide a gripping force which is optimized for the particular diameter of the strand 11 which the strand grab 10 of this invention engages. This gripping force prevents lateral sliding of the ladder 12 along the strand 11 while the ladder 12 is in use.

The strand grabs 10 of the present invention:

1. Ensure safety for the ladder 12 user when climbing to the top of the ladder 12 to begin working because the ladder 12 is fully secured when the user begins climbing.
2. Provides ease of set up and reduced setup time for the users because the gripping action is automatic and fully actuated when the user's weight is on the ladder 12.
3. Provides the grip force to be optimized for different strands over a range of strand diameters to ensure minimal lateral ladder 12 movement.
4. The strand grabs 10 are easily stowed when not needed to prevent damage and to allow ease of transport for the ladder 12.

FIG. 1 shows the strand grab 10 in its completed assembly form.

FIGS. 2 and 3 show the strand grab 10 gate mechanism in an open and closed position, respectively. The gate assembly 16 is assembled to the hook assembly 14 by way of a welded pivot pin 24 that is a part of the hook assembly 14. This pivot pin 24 is the pivot point for the gate assembly 16 and allows the gate assembly 16 to rotate up and down. The cam pin 22, as shown in both figures, rides on a cam profile 44 built in to the gate assembly 16. This pivot pin 24 is at a fixed height and does not move. As force is applied to the hook assembly 14 in the upward motion, the gate assembly 16 lifts with it from the point of the pivot pin 24. As it rises, the cam pin 22 pushes down on the cam profile 44 of the gate assembly 16 therefore causing the gate assembly 16 to rotate up to a closed position. This profile has also been optimized to give the desired speed and clamp force that is need to ensure safe operation.

The biasing spring 18, preferably a torsion spring, wraps around both ends of the pivot pin 24 just inside the first and second gate portions 36, 38, and a first stem 72 of the spring extends from the first end of the pivot pin 24 outward from the pivot pin 24 and attaches to the top of the first gate portion 36 and a second stem 74 of the spring extends from the second end of the pivot pin 24 outward from the pivot pin 24 and attaches to the top of the second gate portion 38. See FIG. 2. An inner loop 76 of the torsion spring extends upwards from the first end of the pivot pin 24 across the interior side 34 of the shaft 30 and down to the second end of the pivot pin 24. The pivot pin 24 is welded to the interior side 34 of the shaft 30, for instance, to a flat plate 82 of the shaft 30, thus capturing the torsion spring in place so the inner loop 76 is in contact to the interior side 34 of the shaft 30, the first stem 72 of the spring attaches to the top of the first gate portion 36 and the second stem 74 of the spring attaches to the top of the second gate portion 38. The biasing force from the torsion spring applied through the first stem 72 and the second stem 74 of the spring downwards to the top of the first gate portion 36 and the second gate portion 38 maintains the gate assembly 16 into the open position. The inner loop 76 pushing against the interior side 34 of the shaft 30 acts essentially as leverage for the first and second stamps to apply the spring biasing force downwards against the first and second gate assemblies. It is only when the first hook assembly rests on the strand 11 does the load of the ladder 12 cause the cam pin 22 to move down and apply a force to the cam profiles 44 of the first and second gate portions 36, 38 which overcomes the biasing force of the first stem 72 and second stem 74 of the spring against the first and second gate portions 36, 38, causing the first and second gate portions 36, 38 to rotate upwards about the pivot pin 24 into a closed position with the hook assembly 14.

FIG. 4 shows the strand grab 10 mounted to an extension ladder 12. The orientation that it is in is considered the "STOW" or storage position. This is the condition that the strand grab 10 should be in when it is not being used.

FIG. 5 shows the strand grab 10 mounted to an extension ladder 12. The orientation that it is in is considered the "DEPLOY" or ready to use position. This is the orientation that the strand grab 10 should be set to when the user requires it.

To stow and deploy, the user simply presses down on the first and second hook portions 48, 50 and rotates them to the desired position. Once the user has set the desired position, the user may let go of the first and second hook portions 48, 50 and the hook assembly 14 will move to a position (by compressive spring force) that will lock the rotation. This Stowing and Deploying system is the same as Werner Co. previous strand hook offering.

FIG. 6 shows the first and second hook portions 48, 50 of the first and second strand grabs 10A, 10B being placed over a strand 11. At this point, the gate assemblies are still in the down or in the open position because no force is being applied to the first and second hook portions 48, 50.

FIG. 7 shows the hook assemblies and gate assemblies fully engaged with the strand 11. Once upward force is applied to the first and second hook portions 48, 50 of the first and second strand grabs 10A, 10B, the gate assemblies begin to lift until they clamp onto the strand 11 with the first and second hook portions 48, 50, which will stop the lateral movement of the ladder 12 with respect to the strand 11 as the user is climbing.

There are no extra locking mechanisms or additional ropes for operation of the strand grab 10. This strand grab 10 actuates by the weight of the ladder/user and the force supplied by springs:

1. Double torsion spring: Biases the gate assembly 16 to the down/wide open position and keeps the gate assembly 16 from freely moving around when there is no load on the hook assembly 14.

2. Compression spring 26: This is used specifically for holding the strand grab 10 in either the stowed or deployed positions.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A strand grab for a ladder having a first rail and a second rail comprising:

a hook assembly coupled to the ladder via an attachment assembly;

a gate assembly rotatably coupled to the hook assembly; and a biasing spring engaged with the hook assembly and the gate assembly configured to produce a return biasing force which is less than a weight force of the ladder when the hook assembly rests on a strand allowing the gate assembly to close with the hook assembly and squeeze the strand between the gate assembly and the hook assembly in a closed position and hold the ladder in place with the strand, wherein the hook assembly has a slot, and includes a cam pin disposed therein, wherein when the strand contacts the hook assembly, the cam pin moves downward in the slot and pushes against a portion of the gate assembly causing the gate assembly to be biased into the closed position, wherein when the hook assembly is lifted from the strand and the strand contacts the gate assembly, the cam pin moves upward in the slot allowing the biasing spring to bias the gate assembly away from the hook assembly into an open position and disengages the gate assembly from the strand.

2. The strand grab of claim 1 wherein the hook assembly includes a pivot pin about which the gate assembly rotates.

3. The strand grab of claim 2 wherein the biasing spring directly engages with the pivot pin.

4. The strand grab of claim 3 including a compression spring disposed around a portion of the hook assembly, wherein when the compression spring is compressed, the hook assembly is able to rotate between a stowed position where the hook assembly extends in a plane defined by the first rail and the second rail and a deployed position with the hook assembly extends perpendicular to the plane.

5. The strand grab of claim 4 wherein the hook assembly includes a shaft having a lower end, about which the compression spring is disposed, and a hook portion attached to an upper portion of the shaft.

6. The strand grab of claim 5 wherein the slot is disposed along a length of the hook portion.

7. The strand grab of claim 6 wherein the gate assembly includes a first gate portion and a second gate portion in parallel and spaced relation with the first gate portion, the first gate portion disposed on a first side of the shaft and the second gate portion disposed on a second side of the shaft, the pivot pin rotatably attached to and between the first gate portion and the second gate portion, the first gate portion and the second gate portion each have a cam profile disposed below the cam pin and alongside the slot and an elongate portion extending from the cam profile with the pivot pin disposed between the cam profile and the elongate portion.

8. The strand grab of claim 7 wherein the hook assembly includes a first hook portion and a second hook portion in a parallel and spaced relation with the first hook portion, the first hook portion disposed on the first side of the shaft and the second hook portion disposed on the second side of the shaft, the first hook portion and the second hook portion each having an arc shape with a base attached to the shaft above the slot and a tip, the first hook portion and the second hook portion configured to fit on and about the strand between the base and the tip.

9. The strand grab of claim 8 wherein the lower end of the shaft with the compression spring is disposed within a portion the attachment assembly.

10. The strand grab of claim 1 wherein the hook assembly includes a pad which contacts the strand when the hook assembly and the gate assembly are in the closed position.

11. A ladder for use with a strand comprising:

a first rail;

a second rail in parallel and spaced relation with the first rail;

rungs attached to and extending between the first rail and the second rail, the first rail includes a first strand grab attached to the first rail and the second rail includes a second strand grab attached to the second rail, the first strand grab and the second strand grab each include:

a hook assembly;

a gate assembly rotatably coupled to the hook assembly; and a biasing spring engaged with the hook assembly and the gate assembly configured to produce a return biasing force which is less than a weight force of the ladder when the hook assembly rests on the strand allowing the gate assembly to close with the hook assembly and squeeze the strand between the gate assembly and the hook assembly in a closed position and hold the ladder in place with the strand, wherein the hook assembly has a slot, and includes a cam pin disposed therein, wherein when the strand contacts the hook assembly, the cam pin moves downward in the slot and pushes against a portion of the gate assembly causing the gate assembly to be biased into the closed position, wherein when the hook assembly is lifted from the strand and the strand contacts the gate assembly, the cam pin moves upward in the slot allowing the biasing spring to bias the gate assembly away from the hook assembly into an open position and disengages the gate assembly from the strand.

12. The ladder of claim 11 including a bracket attached to and between the hook assembly of the first strand grab and the second strand grab, the bracket having a V shape which fits to a pole or exterior corner of a structure.

13. A method for using a ladder comprising the steps of:

placing strand grab attached to a rail of the ladder onto a strand;

wherein the strand grab includes a hook assembly, a gate assembly rotatably coupled to the hook assembly, and a biasing spring engaged with the hook assembly and the gate assembly, wherein the hook assembly has a slot, and includes a cam pin disposed therein, resting the hook assembly of the strand grab onto the strand such that a weight of the ladder creates a force larger than that provided by the biasing spring and causes the cam pin to move downward in the slot and pushes against a portion of the gate assembly causing the gate assembly to be biased into a closed position and squeeze the strand between the gate assembly and the hook assembly and hold the ladder in place with the strand; and opening the strand grab by lifting the ladder and creating a lifting force on the ladder which causes the gate assemby to contact the strand, wherein the lifting force causes the cam pin to move upward by in the slot allowing the biasing spring to bias the gate assembly away from the hook assembly into an open position and disengages the strand grab from the strand.

14. A method for making a ladder comprising the steps of:

attaching a first strand grab to a first rail of the ladder via a first attachment assembly; and attaching a second strand grab to a second rail of the ladder via a second attachment assembly, the first strand grab and the second strand grab each including:

a hook assembly;

a gate assembly rotatably coupled to the hook assembly; and a biasing spring engaged with the hook assembly and the gate assembly configured to produce a return biasing force which is less than a weight force of the ladder when the hook assembly rests on a strand allowing the gate assembly to close with the hook assembly and squeeze the strand between the gate assembly and the hook assembly in a closed position and hold the ladder in place with the strand, wherein the hook assembly has a slot, and includes a cam pin disposed therein, wherein when the strand contacts the hook assembly, the cam pinmoves downward in the slot and pushes against a portion of the gate assembly causing the gate assembly to be biased into the closed position, wherein when the hook assembly is lifted from the strand and the strand contacts the gate assembly, the cam pin moves upward in the slot allowing the biasing spring to bias the gate assembly away from the hook assembly into an open position and disengages the gate assembly from the strand.

* * * * *